(12) United States Patent
Choi (10) Patent No.: US 11,369,206 B2
(45) Date of Patent: Jun. 28, 2022

(54) CONNECTORS FOR COLLAPSIBLE BED FRAME AND COLLAPSIBLE BED FRAME HAVING SAME

(71) Applicant: Inno-Sports Co., Ltd., Xiamen (CN)

(72) Inventor: Kwan Jun Choi, Xiamen (CN)

(73) Assignee: Inno-Sports Co., Ltd., Xiamen (CN)

( * ) Notice: Subject to any disclaimer, the term of this patent is extended or adjusted under 35 U.S.C. 154(b) by 109 days.

(21) Appl. No.: 16/432,131

(22) Filed: Jun. 5, 2019

(65) Prior Publication Data

US 2019/0387892 A1 Dec. 26, 2019

(30) Foreign Application Priority Data

Jun. 21, 2018 (CN) .......................... 201820960136.0

(51) Int. Cl.
*A47C 19/12* (2006.01)
*A47C 19/02* (2006.01)
*F16B 12/56* (2006.01)

(52) U.S. Cl.
CPC .......... *A47C 19/126* (2013.01); *A47C 19/027* (2013.01); *F16B 12/56* (2013.01)

(58) Field of Classification Search
CPC .......... F16B 12/56; F16B 12/54; F16B 12/44; A47C 19/027; A47C 19/122; A47C 19/005; A47C 19/025; A47C 19/02; A47C 19/021; A47C 19/14; A47C 19/12
See application file for complete search history.

(56) References Cited

U.S. PATENT DOCUMENTS

| | | | |
|---|---|---|---|
| 273,332 A | 3/1883 | Woodin |
| 277,541 A | 5/1883 | Bowers |
| 372,913 A | 11/1887 | Hopkins |
| 557,997 A | 4/1896 | Nessel |
| 687,238 A | 11/1901 | Johnson |
| 705,384 A | 7/1902 | Cooper |
| 736,569 A | 8/1903 | Webb |
| 746,211 A | 12/1903 | Webb |
| 797,011 A | 8/1905 | Mosier |
| 984,823 A | 2/1911 | Linden |
| 1,072,550 A | 9/1913 | Wilson |
| 1,694,420 A | 12/1928 | Joselowitz |
| 1,760,955 A | 6/1930 | Moss |

(Continued)

FOREIGN PATENT DOCUMENTS

DE 102018130110 A1 5/2020
EP 2182151 A2 5/2010

*Primary Examiner* — Robert G Santos
*Assistant Examiner* — Alison N Labarge
(74) *Attorney, Agent, or Firm* — Morgan, Lewis & Bockius LLP (57) ABSTRACT

A collapsible bed frame includes a plurality of lateral bar units, a plurality of first longitudinal bar units, and a plurality of second longitudinal bar units. The plurality of lateral bar units includes first and second outer lateral bar units and at least one inner lateral bar unit. A collapsible bed frame also includes a plurality of first connectors, each having a body and a supporting piece. The body is fixedly connected with an end of the first or second outer lateral bar unit, and the supporting piece is rotatably connected with an adjacent first or second longitudinal bar unit. The collapsible bed frame can contract and expand while the lateral and longitudinal bar units are connected with each other.

20 Claims, 6 Drawing Sheets

(56) References Cited

U.S. PATENT DOCUMENTS

| | | | |
|---|---|---|---|
| 1,806,358 A | 5/1931 | Manly | |
| 1,833,692 A | 11/1931 | Silvio | |
| 2,057,334 A | 10/1936 | Hannum | |
| 2,492,070 A | 12/1949 | Stone et al. | |
| 2,584,491 A | 2/1952 | Ted | |
| 2,602,012 A | 7/1952 | Doty | |
| 2,680,252 A | 6/1954 | Hatton | |
| 2,772,424 A * | 12/1956 | Roche | A47C 19/124 5/176.1 |
| 2,782,075 A | 2/1957 | Roscoe | |
| 2,823,392 A | 2/1958 | Howard | |
| 2,905,513 A | 9/1959 | Kane | |
| 2,962,085 A | 11/1960 | Frank | |
| 2,983,931 A | 5/1961 | Nelson | |
| 3,185,499 A | 5/1965 | Reese | |
| 3,245,363 A | 4/1966 | Kanitz | |
| 3,296,983 A | 1/1967 | Brush | |
| 3,504,877 A | 4/1970 | Lyon, Sr. | |
| 3,605,142 A | 9/1971 | Weinhart | |
| 3,613,132 A | 10/1971 | Weinhart | |
| 3,657,748 A | 4/1972 | Weinhart | |
| 3,984,884 A | 10/1976 | Spitz | |
| 4,070,717 A * | 1/1978 | Kitchen | A47C 19/005 5/176.1 |
| 4,391,008 A | 7/1983 | Yamaoka | |
| 4,431,164 A | 2/1984 | Jungo | |
| 4,745,644 A | 5/1988 | Pottschmidt | |
| 4,788,727 A * | 12/1988 | Liu | A47C 19/005 5/174 |
| 4,974,526 A | 12/1990 | Wiygul, Jr. | |
| 5,469,589 A | 11/1995 | Steed | |
| 5,562,050 A | 10/1996 | Colquhoun | |
| 5,884,566 A | 3/1999 | Chen | |
| 5,943,968 A | 8/1999 | Dobson | |
| 6,449,786 B1 | 9/2002 | Voit | |
| 6,485,219 B1 | 11/2002 | Beyer | |
| 7,003,822 B1 | 2/2006 | Sheehy | |
| 7,376,986 B2 | 5/2008 | Smith | |
| 7,690,316 B2 | 4/2010 | Yoo | |
| 7,739,760 B2 | 6/2010 | Smith | |
| 7,784,122 B2 | 8/2010 | Oh | |
| RE41,763 E | 9/2010 | Ng | |
| 7,845,030 B1 | 12/2010 | Pollard | |
| 8,006,328 B2 * | 8/2011 | Polevoy | A47C 19/124 5/200.1 |
| 8,006,329 B2 | 8/2011 | Oh | |
| 8,042,205 B2 | 10/2011 | Schulz, Jr. | |
| 8,176,581 B2 | 5/2012 | Schulz, Jr. | |
| 8,678,490 B2 | 3/2014 | Chen | |
| 8,822,885 B2 | 9/2014 | Daneshvar | |
| 8,832,876 B1 * | 9/2014 | Oh | A47C 19/12 5/116 |
| 8,935,819 B1 | 1/2015 | Hartley | |
| 8,978,176 B1 | 3/2015 | Oh | |
| 8,990,979 B1 | 3/2015 | Craver | |
| 9,021,964 B2 | 5/2015 | Peng | |
| 9,332,833 B2 | 5/2016 | Kim | |
| 9,596,943 B1 | 3/2017 | Hartley | |
| 9,924,804 B2 | 3/2018 | Hartley | |
| 10,321,767 B2 | 6/2019 | Jin | |
| 10,687,630 B1 | 6/2020 | Hartley | |
| 10,702,070 B2 | 7/2020 | Oh | |
| 10,959,529 B2 | 3/2021 | Choi | |
| 10,959,530 B2 | 3/2021 | Choi | |
| 10,966,537 B1 | 4/2021 | Denney | |
| 2006/0107456 A1 * | 5/2006 | Joseph | A47C 17/58 5/2.1 |
| 2008/0109958 A1 | 5/2008 | Wang | |
| 2009/0025143 A1 * | 1/2009 | Oh | A47C 19/005 5/201 |
| 2010/0170190 A1 | 7/2010 | Schulz, Jr. | |
| 2010/0171342 A1 | 7/2010 | Chen | |
| 2010/0235989 A1 | 9/2010 | Jin | |
| 2010/0275372 A1 | 11/2010 | Oh | |
| 2010/0299831 A1 | 12/2010 | Lee | |
| 2011/0258777 A1 | 10/2011 | Schulz, Jr. | |
| 2012/0204770 A1 | 8/2012 | Grace | |
| 2012/0304380 A1 | 12/2012 | Jin | |
| 2013/0000038 A1 * | 1/2013 | Schulz, Jr. | A47C 19/025 5/400 |
| 2013/0025051 A1 * | 1/2013 | Syrowitz | A47C 19/025 5/400 |
| 2014/0208506 A1 | 7/2014 | Bartelsmeyer | |
| 2016/0143446 A1 * | 5/2016 | Hartley | A47C 23/062 5/236.1 |
| 2016/0255963 A1 | 9/2016 | Jones | |
| 2016/0296004 A1 | 10/2016 | Peng | |
| 2018/0042391 A1 | 2/2018 | Oh | |
| 2018/0055235 A1 | 3/2018 | Choi | |
| 2018/0116412 A1 | 5/2018 | Jin | |
| 2018/0140103 A1 | 5/2018 | Thompson | |
| 2019/0387888 A1 | 12/2019 | Choi | |
| 2019/0387889 A1 | 12/2019 | Choi | |
| 2019/0387890 A1 | 12/2019 | Choi | |
| 2019/0387891 A1 | 12/2019 | Choi | |
| 2019/0387892 A1 | 12/2019 | Choi | |
| 2019/0387893 A1 | 12/2019 | Choi | |
| 2020/0022501 A1 | 1/2020 | Choi | |
| 2020/0022502 A1 | 1/2020 | Choi | |
| 2020/0022503 A1 | 1/2020 | Choi | |
| 2020/0146438 A1 | 5/2020 | Choi | |
| 2020/0378426 A1 | 12/2020 | Choi | |

\* cited by examiner

CONNECTORS FOR COLLAPSIBLE BED FRAME AND COLLAPSIBLE BED FRAME HAVING SAME

CROSS-REFERENCE TO RELATED APPLICATIONS

The present application claims priority to Chinese Utility Model Application CN 201820960136.0 filed Jun. 21, 2018. The disclosure of the application is incorporated herein for all purposes by reference in its entirety.

FIELD OF THE INVENTION

The present invention generally relates to bed frames and beds, and more particularly, to connectors, collapsible bed frames and beds having collapsible bed frames.

BACKGROUND

Many existing foldable bed frames are not user-friendly. For instance, existing bed frames are usually shipped with most of the components disassembled to save space and reduce cost. To use such a bed frame, one needs to assemble it first. This often involves connecting a number of lateral and longitudinal bars by screws, bolts or other connectors. Conversely, to fold such a bed frame, one needs to remove those connectors and disassemble the lateral and longitudinal bars. Assembling and disassembling the bed frame not only takes time and energy, but also requires tools such as screwdrivers and wrenches available every time when assembling or disassembling is desired. Moreover, disassembled parts, in particular those screws, bolts or other connectors, have to be stored carefully so that they would not get lost. Otherwise, the bed frame may not be assembled properly for next use.

Given the current state of the art, there remains a need for collapsible beds and bed frames that address the abovementioned issues.

The information disclosed in this Background section is provided for an understanding of the general background of the invention and is not an acknowledgement or suggestion that this information forms part of the prior art already known to a person skilled in the art.

SUMMARY OF THE INVENTION

The present invention provides connectors, collapsible bed frames and beds having such collapsible bed frames.

In various exemplary embodiments, the present invention provides a collapsible bed frame including a plurality of lateral bar units, a plurality of first longitudinal bar units, a plurality of second longitudinal bar units, and a plurality of first connectors. Each lateral bar unit is arranged substantially parallel to another, and has a first end and a second end. The plurality of lateral bar units includes a first outer lateral bar unit, a second outer lateral bar unit, and at least one inner lateral bar unit disposed between the first and second outer lateral bar units. Between each of two adjacent lateral bar units, a first longitudinal bar unit in the plurality of first longitudinal bar units is disposed at a first side of the collapsible bed frame and rotatably connected with the first ends of the two adjacent lateral bar units; and a second longitudinal bar unit in the plurality of second longitudinal bar units is disposed at a second side of the collapsible bed frame and rotatably connected with the second ends of the two adjacent lateral bar units. Each first connector includes a body and a supporting piece. The body is connected with the first or second end of a respective outer lateral bar unit in the first and second outer lateral bar units. The supporting piece is fixedly coupled with the body, and formed with a hole, wherein an end of a corresponding first or second longitudinal bar unit is supported by the supporting piece and rotatably connected with the supporting piece by a fastener through the hole. One or more receptacles are formed or disposed at each bar unit in the plurality of lateral bar units, the plurality of first longitudinal bar units, and the plurality of second longitudinal bar units and configured to removably receive one or more supporting bar units.

In some exemplary embodiments, between the respective outer lateral bar unit and its adjacent inner lateral bar unit, each of the first and second longitudinal bar units includes a first longitudinal segment unit and a second longitudinal segment unit rotatably connected with each other at one ends thereof, wherein the other end of the first longitudinal segment unit is connected with the supporting piece of the corresponding first connector at the respective outer lateral bar unit, and the other end of the second longitudinal segment unit is connected with the adjacent inner lateral bar unit.

In some exemplary embodiments, each first connector further includes a limiting piece substantially perpendicular to the supporting piece.

In an exemplary embodiment, the limiting piece is disposed at an interior side of the bed frame with respect to the end of the corresponding first or second longitudinal bar unit.

In some exemplary embodiments, the body of each first connector is prismatic with a substantially fan-shaped cross section.

In various exemplary embodiments, each bar unit in the plurality of lateral bar units, the plurality of first longitudinal bar units, and the plurality of second longitudinal bar units includes an upper bar and a lower bar. The upper bars of the plurality of lateral bar units, the plurality of first longitudinal bar units, and the plurality of second longitudinal bar units collectively form an upper frame of the collapsible bed frame. The lower bars of the plurality of lateral bar units, the plurality of first longitudinal bar units, and the plurality of second longitudinal bar units collectively form a lower frame of the collapsible bed frame.

In some exemplary embodiments, a collapsible bed frame further includes a plurality of first vertical supporting bars disposed between the upper and lower frames, each having an upper end connected with the upper frame and a lower end connected with the lower frame.

In some exemplary embodiments, the receptacles at the first and second longitudinal bar units are formed or disposed at the upper bars of the first and second longitudinal bar units.

In some exemplary embodiments, the one or more supporting bar units include one or more longitudinal supporting bar units coupled to the receptacles at the lateral bar units. Each longitudinal supporting bar unit in the one or more longitudinal supporting bar units includes an upper longitudinal supporting bar, a lower longitudinal supporting bar, and one or more second vertical supporting bars disposed between the upper and lower longitudinal supporting bars. Each second vertical supporting bar has an upper end connected with the upper longitudinal supporting bar and a lower end connected with the lower longitudinal supporting bar.

In various exemplary embodiments, the present invention provides a collapsible bed frame including a plurality of lateral bar units, a plurality of first longitudinal bar units, a plurality of second longitudinal bar units, and a plurality of first connectors. Each lateral bar unit is arranged substantially parallel to another, and has a first end and a second end. The plurality of lateral bar units includes a first outer lateral bar unit, a second outer lateral bar unit, and at least one inner lateral bar unit disposed between the first and second outer lateral bar units. Between each of two adjacent lateral bar units, a first longitudinal bar unit in the plurality of first longitudinal bar units is disposed at a first side of the collapsible bed frame and rotatably connected with the first ends of the two adjacent lateral bar units; and a second longitudinal bar unit in the plurality of second longitudinal bar units is disposed at a second side of the collapsible bed frame and rotatably connected with the second ends of the two adjacent lateral bar units. Each first connector includes a body and a supporting piece. The body is connected with the first or second end of a respective outer lateral bar unit in the first and second outer lateral bar units. The supporting piece is fixedly coupled with the body, and formed with a hole, wherein an end of a corresponding first or second longitudinal bar unit is supported by the supporting piece and rotatably connected with the supporting piece by a fastener through the hole.

In some exemplary embodiments, the body of each first connector is cylindrical with a substantially fan-shaped cross section.

In various exemplary embodiments, the body of each first connector includes a curved surface, a first surface and a second surface. The curved surface faces outwardly and serves as a rounded corner for the collapsible bed frame. The first surface is substantially flat and faces the respective outer lateral bar unit, wherein the first or second end of the outer lateral bar unit is fixedly connected with the first surface. The second surface is substantially flat and faces the corresponding first or second longitudinal bar unit, wherein the supporting piece is fixedly connected with the end of the corresponding first or second longitudinal bar unit.

In some exemplary embodiments, each first connector further includes a limiting piece to prevent the corresponding first or second longitudinal bar unit from rotating beyond its expanded state. The limiting piece is disposed at an interior side of the bed frame with respect to the end of the corresponding first or second longitudinal bar unit and substantially perpendicular to the supporting piece. The limiting piece is integrally formed with the supporting piece, or the limiting piece is an individual piece fixed on the supporting piece or on the body.

In some exemplary embodiments, between the respective outer lateral bar unit and its adjacent inner lateral bar unit, each of the first and second longitudinal bar units includes a first longitudinal segment unit and a second longitudinal segment unit rotatably connected with each other at one ends thereof, wherein the other end of the first longitudinal segment unit is connected with the supporting piece of the corresponding first connector at the respective outer lateral bar unit, and the other end of the second longitudinal segment unit is connected with the adjacent inner lateral bar unit.

In various exemplary embodiments, each bar unit in the plurality of lateral bar units, the plurality of first longitudinal bar units, and the plurality of second longitudinal bar units includes an upper bar and a lower bar. The upper bars of the plurality of lateral bar units, the plurality of first longitudinal bar units, and the plurality of second longitudinal bar units collectively form an upper frame of the collapsible bed frame. The lower bars of the plurality of lateral bar units, the plurality of first longitudinal bar units, and the plurality of second longitudinal bar units collectively form a lower frame of the collapsible bed frame.

In some exemplary embodiments, a collapsible bed frame further includes a plurality of first vertical supporting bars disposed between the upper and lower frames, each having an upper end connected with the upper frame and a lower end connected with the lower frame.

In various exemplary embodiments, a collapsible bed frame further includes one or more receptacles formed or disposed at each bar unit in the plurality of lateral bar units, the plurality of first longitudinal bar units, and the plurality of second longitudinal bar units and configured to removably receive one or more supporting bar units.

In some exemplary embodiments, the receptacles at the first and second longitudinal bar units are formed or disposed at the upper bars of the first and second longitudinal bar units, and the one or more supporting bar units includes one or more lateral supporting bars coupled to the receptacles at the first and second longitudinal bar units.

In some exemplary embodiments, the one or more supporting bar units include one or more longitudinal supporting bar units coupled to the receptacles at the lateral bar units. Each longitudinal supporting bar unit in the one or more longitudinal supporting bar units includes an upper longitudinal supporting bar, a lower longitudinal supporting bar, and one or more second vertical supporting bars disposed between the upper and lower longitudinal supporting bars. Each second vertical supporting bar has an upper end connected with the upper longitudinal supporting bar and a lower end connected with the lower longitudinal supporting bar.

The connectors, bed frames and beds of the present invention have other features and advantages that will be apparent from, or are set forth in more detail in, the accompanying drawings, which are incorporated herein, and the following Detailed Description, which together serve to explain certain principles of exemplary embodiments of the present invention.

BRIEF DESCRIPTION OF THE DRAWINGS

The accompanying drawings, which are incorporated into and constitute a part of this specification, illustrate one or more exemplary embodiments of the present invention and, together with the Detailed Description, serve to explain the principles and implementations of exemplary embodiments of the invention.

As will be apparent to those of skill in the art, the components illustrated in the figures described above are combinable in any useful number and combination. The figures are intended to be illustrative in nature and are not limiting.

DETAILED DESCRIPTION

Reference will now be made in detail to implementations of exemplary embodiments of the present invention as illustrated in the accompanying drawings. The same reference indicators will be used throughout the drawings and the following detailed description to refer to the same or like parts. Those of ordinary skill in the art will understand that the following detailed description is illustrative only and is not intended to be in any way limiting. Other embodiments of the present invention will readily suggest themselves to such skilled persons having benefit of this disclosure.

In the interest of clarity, not all of the routine features of the implementations described herein are shown and described. It will be appreciated that, in the development of any such actual implementation, numerous implementation-specific decisions are made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

Many modifications and variations of the exemplary embodiments set forth in this disclosure can be made without departing from the spirit and scope of the exemplary embodiments, as will be apparent to those skilled in the art. The specific exemplary embodiments described herein are offered by way of example only, and the disclosure is to be limited only by the terms of the appended claims, along with the full scope of equivalents to which such claims are entitled.

Embodiments of the present invention are described in the context of collapsible bed frames and beds having one or more such collapsible bed frames. The collapsible beds and bed frames of the present invention can be of various sizes including but not limited to twin, full, queen and king sizes, and of various shapes including but not limited to rectangles and squares. They can be made of various materials including but not limited to metals (e.g., iron, steel, aluminum), plastics and woods.

In general, a collapsible bed frame of the present invention includes a plurality of lateral bar units, a plurality of first longitudinal bar units and a plurality of second longitudinal bar units. The plurality of lateral units is disposed in a lateral direction of the bed frame and arranged substantially parallel to each other. The plurality of first longitudinal bar units is disposed at a first side of the bed frame, and the plurality of second longitudinal bar units is disposed at a second side of the bed frame. Among the lateral and longitudinal bar units, adjacent bar units are rotatably connected with each other such that the bed frame of the present invention can contract and expand with no need to disconnect the lateral and longitudinal bar units.

Figure 5:
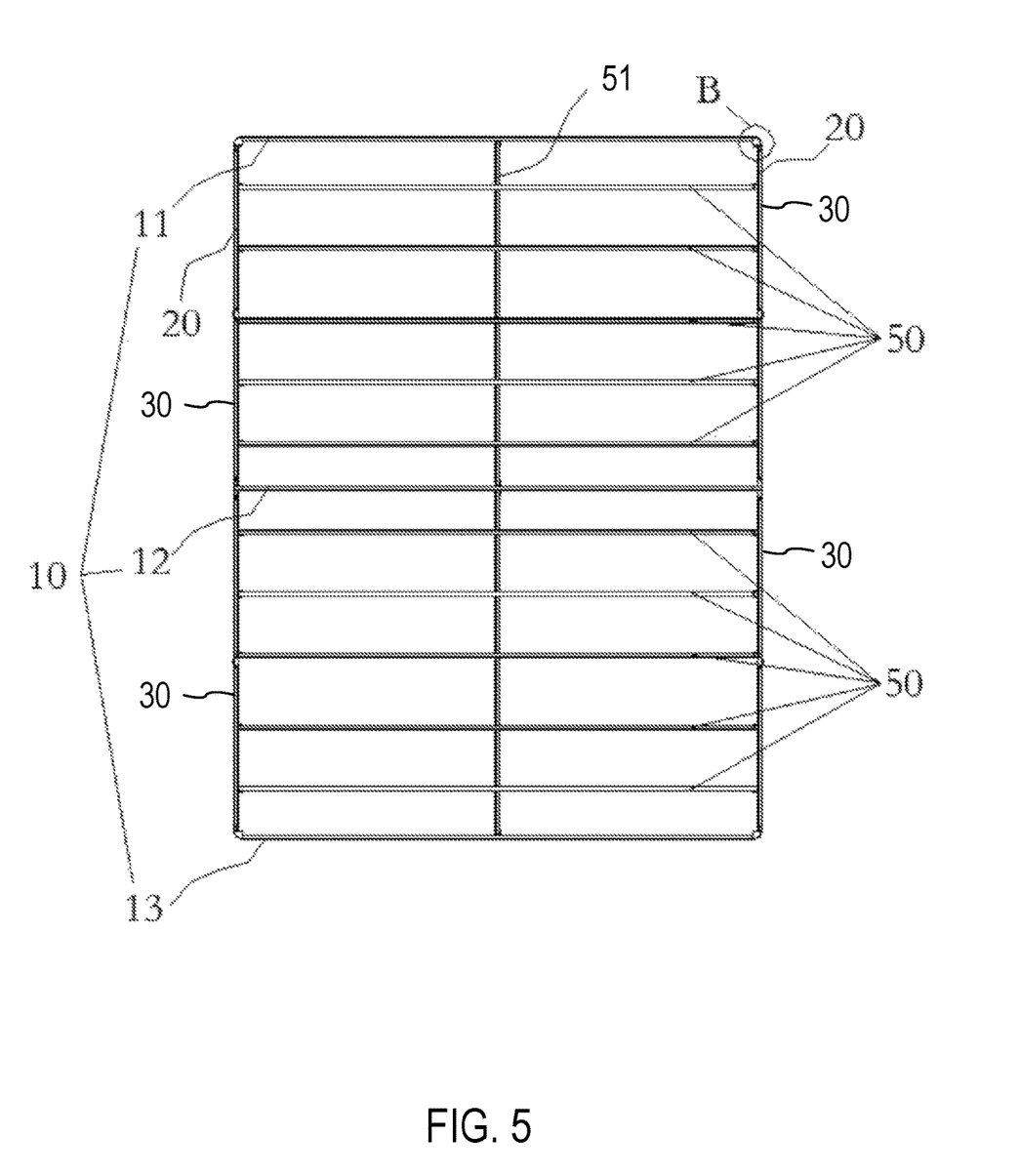
FIG. 5 is a top view illustrating an exemplary bed frame in an expanded state in accordance with exemplary embodiments of the present invention.

In various exemplary embodiments, the plurality of lateral bar units includes a first outer lateral bar unit, a second outer lateral bar unit, and at least one inner lateral bar unit disposed between the first and second outer lateral bar units. In some exemplary embodiments, there is one single inner lateral bar unit, and in some other exemplary embodiments, there are two, three or more inner lateral bar units. By way of example, FIG. 5 illustrates a collapsible bed frame including a plurality of lateral bar units indicated by reference numeral 10. The plurality of lateral bar units includes first outer lateral bar unit 11, second outer lateral bar unit 13, and inner lateral bar unit 12 disposed between first outer lateral bar unit 11 and second outer lateral bar unit 13.

Between each of two adjacent lateral bar units, a first longitudinal bar unit in the plurality of first longitudinal bar units is disposed at a first side of the collapsible bed frame and rotatably connected with the first ends of the two adjacent lateral bar units. Also, a second longitudinal bar unit in the plurality of second longitudinal bar units is disposed at a second side of the collapsible bed frame and rotatably connected with the second ends of the two adjacent lateral bar units. It should be noted that the first longitudinal bar unit can be the same as or different from the second longitudinal bar unit. It should also be noted that any two of first longitudinal bar units can be the same as or different from each other. Similarly, any two of second longitudinal bar units can be the same as or different from each other.

By way of example, FIG. 5 illustrates a plurality of first longitudinal bar units (indicated by reference numeral 20) disposed at a first side of the collapsible bed frame (e.g., left side in the figure), and a plurality of second longitudinal bar units (indicated by reference numeral 20) disposed at a second side of the collapsible bed frame (e.g., right side in the figure). In the illustrated embodiment, two first longitudinal bar units 30 are disposed at the first side and two second longitudinal bar units 30 at the second side of the collapsible bed frame. One of the two first longitudinal bar units is disposed between first outer lateral bar unit 11 and inner lateral bar unit 12 and rotatably connected with the first ends (e.g., left ends) of the first outer lateral bar unit and inner lateral bar unit. The other of the two first longitudinal bar units is disposed between inner lateral bar unit 12 and second outer lateral bar unit 13 and rotatably connected with the first ends (e.g., left ends) of the inner lateral bar unit and second outer lateral bar unit. Similarly, one of the two second longitudinal bar units is disposed between first outer lateral bar unit 11 and inner lateral bar unit 12 and rotatably connected with the second ends (e.g., right ends) of the first outer lateral bar unit and inner lateral bar unit. The other of the two second longitudinal bar units is disposed between inner lateral bar unit 12 and second outer lateral bar unit 13 and rotatably connected with the second ends (e.g., right ends) of the inner lateral bar unit and second outer lateral bar unit.

Figure 2:
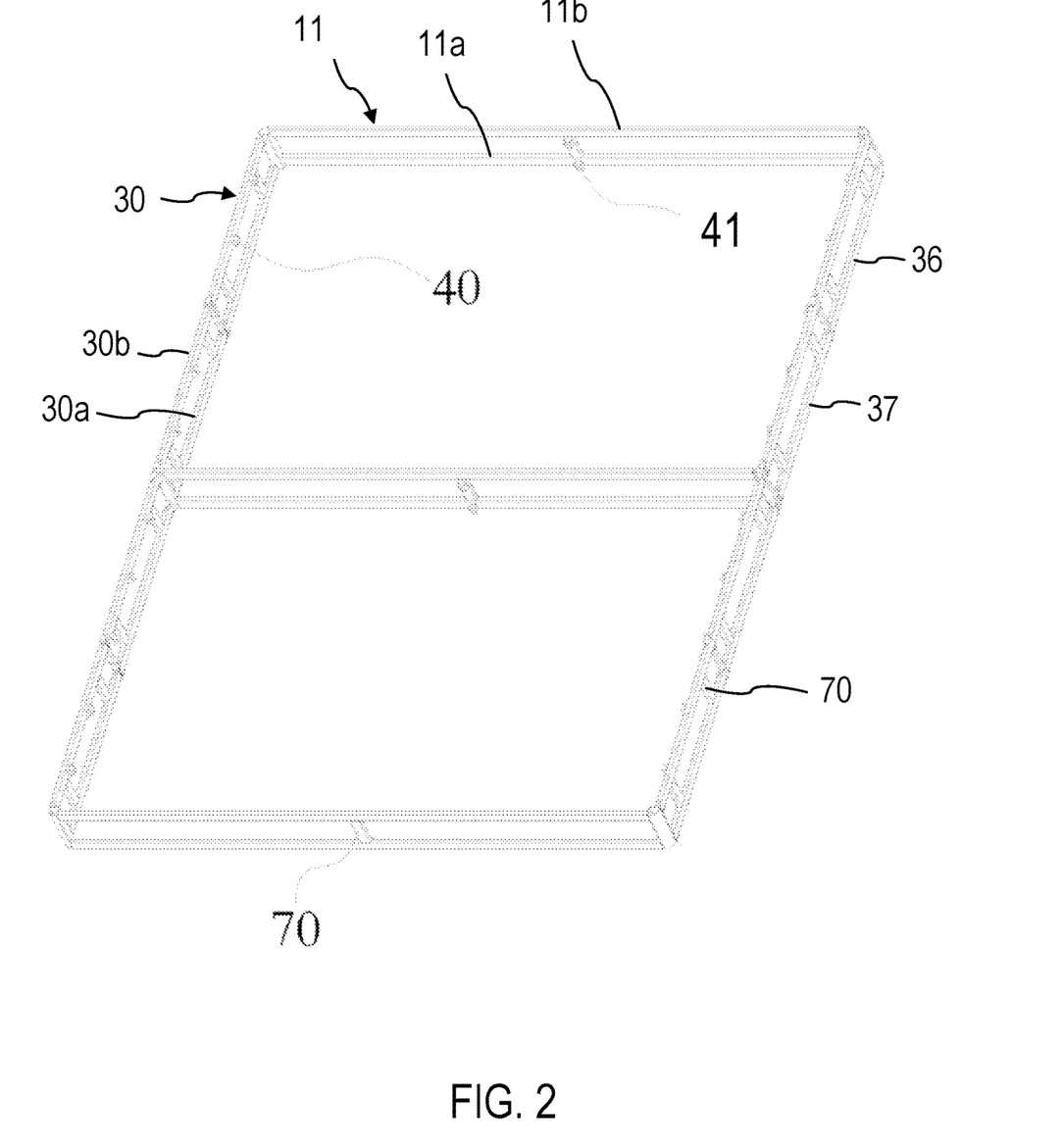
FIG. 2 is a perspective view illustrating an exemplary bed frame in an expanded state in accordance with exemplary embodiments of the present invention.
Figure 3:
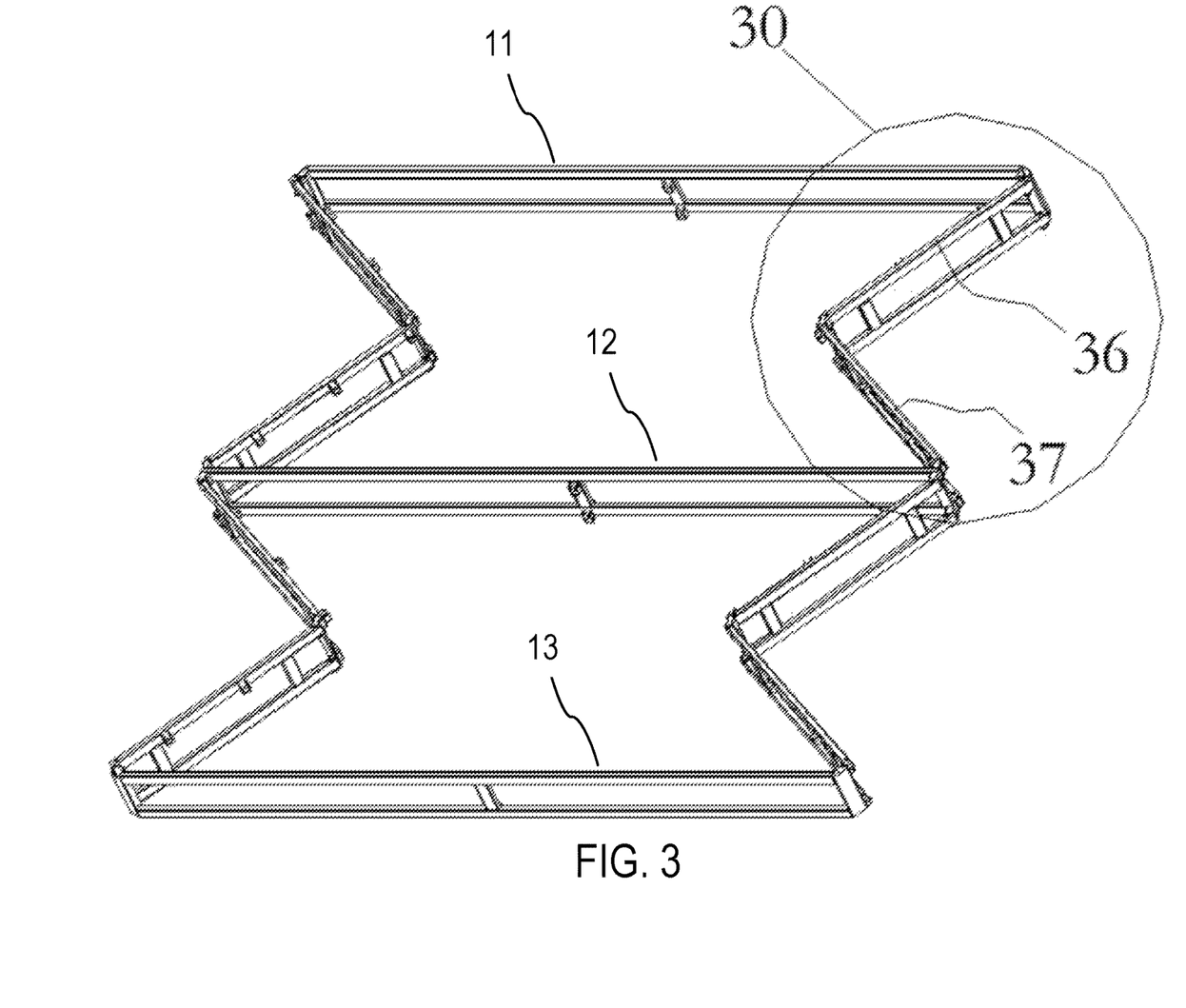
FIG. 3 is a perspective view illustrating an exemplary bed frame in an intermediate state in accordance with exemplary embodiments of the present invention.

In various exemplary embodiments, a longitudinal bar unit is made of two or more longitudinal segment units rotatably connected with each other. In some exemplary embodiments, each of the first and second longitudinal bar units is made of two or more longitudinal segment units rotatably connected with each other. It should be noted that the two or more longitudinal segment units can be the same as or different frame each other, for instance, having different lengths. By way of example, FIG. 3 illustrates longitudinal bar unit 30 made of two longitudinal segment units, e.g., first longitudinal segment unit 36 and second longitudinal segment unit 37. The first and second longitudinal segment units are rotatably connected with each other at their proximal ends. As such, during contraction, the first and second segment units retreat into an interior space defined by the collapsible bed frame when it is fully expanded. This allows the bed frame to contract from an expanded state as illustrated in FIG. 2 to an intermediate state as illustrated in FIG. 3. Further contraction reduces the angle between first longitudinal segment unit 36 and second longitudinal segment unit 37, and leads to a contracted state where first longitudinal segment unit 36 and second longitudinal segment unit 37 become substantially parallel to each other. This significantly reduces the size of the bed frame in the contracted state. Moreover, this contraction process is reversible. For instance, it allows the bed frame to expand from the contracted state, through the intermediate state as illustrated in FIG. 3, to the expanded state as illustrated in FIG. 2. Further, the contraction and expansion of the bed frame are performed while the lateral bar units and the first and second longitudinal bar units are connected with each other. There is no need to disconnect or disassemble these parts.

A lateral or longitudinal bar unit of the present invention can include a single bar or a stack of bars. As used herein, an exemplary stack of bars refers to two, three or more bars arranged one over another, e.g., in a vertical direction when the bed frame is expanded and placed on the ground. The two, three or more bars can be but not necessarily must be in direct contact. For instance, a bar unit can include a lower bar, an upper bar above the lower bar, and/or vertical support(s) in between. By way of example, FIG. 2 illustrates first outer lateral bar unit 11 including lower lateral bar 11a and upper lateral bar 11b, and longitudinal bar unit 30 including lower longitudinal bar 30a and upper longitudinal bar 30b. In some exemplary embodiments, a lateral or longitudinal bar unit of the present invention includes one or more vertical supports disposed between the upper and lower bars to support the upper bar. For instance, FIG. 2 illustrates one or more vertical supports 70 disposed between lower longitudinal bar 30a and upper longitudinal bar 30b to support upper longitudinal bar 30b. Vertical supports 70 enhances the strength of the bed frame.

Figure 1:
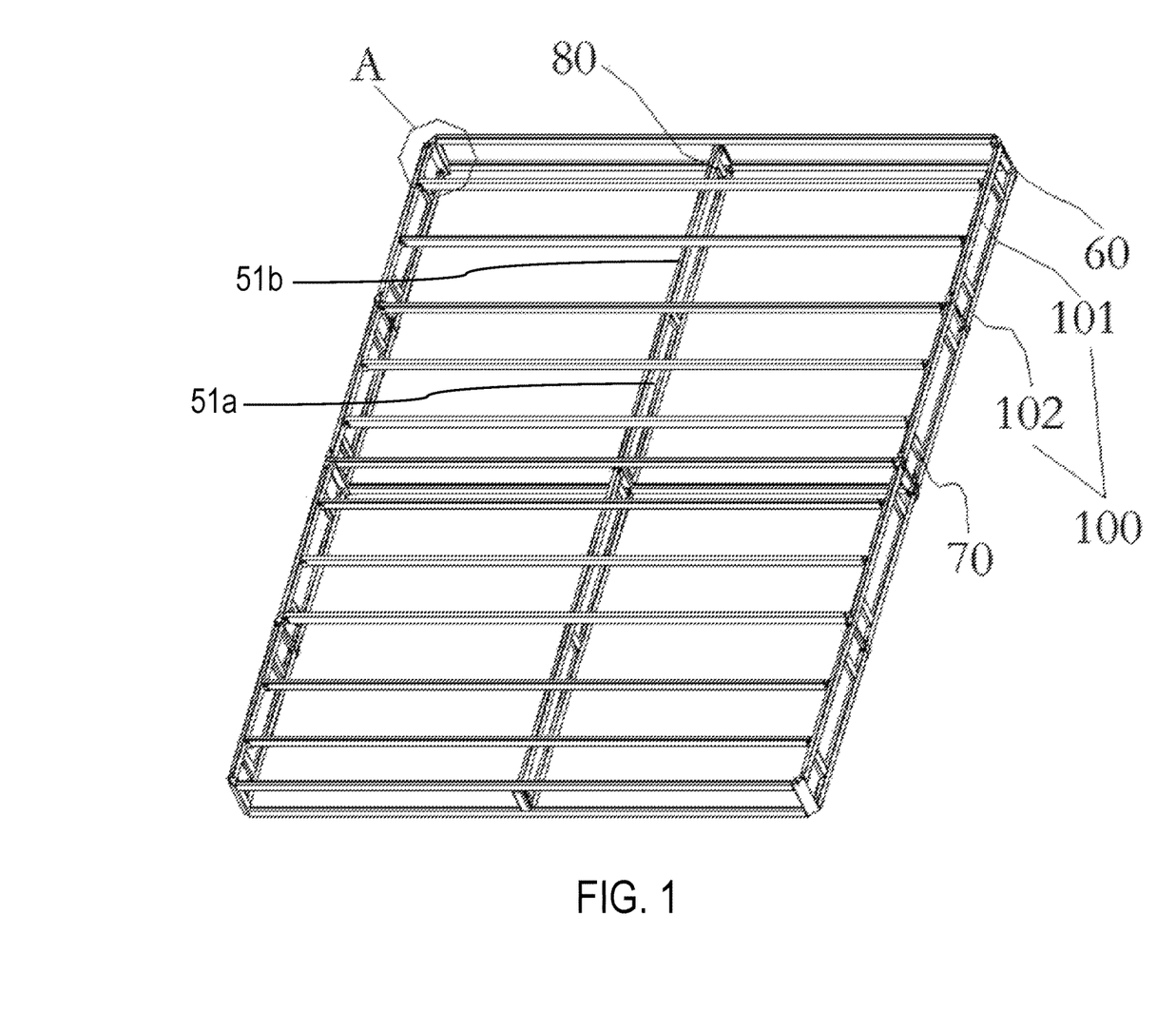
FIG. 1 is a perspective view illustrating an exemplary bed frame in an expanded state in accordance with exemplary embodiments of the present invention.

In various exemplary embodiments, the upper bars of the lateral bar units, first longitudinal bar units, and second longitudinal bar units collectively form an upper frame of the collapsible bed frame such as upper frame 101 as illustrated in FIG. 1. Similar, the lower bars of the plurality of lateral bar units, first longitudinal bar units, and second longitudinal bar units collectively form a lower frame of the collapsible bed frame, such as lower frame 102. Together, the upper and lower frames are referred to as a frame unit such as frame unit 100. It should be noted that a frame unit can include of a single frame, or a stack of frames that includes two, three or more frames arranged one over another. Generally, a stack of frames is stronger than a single frame. A stack of frames also increases the height of the collapsible bed frame.

In various exemplary embodiments, receptacles are formed or disposed at some bar units. In some exemplary embodiments, at least one receptacle is formed or disposed at each bar unit in the plurality of lateral bar units, the plurality of first longitudinal bar units, and the plurality of second longitudinal bar units. Receptacles are configured to facilitate easy installation of lateral and/or longitudinal supporting bar units for supporting a mattress or the like, and to facilitate easy removal of the supporting bar units out before contracting the bed frame.

By way of example, FIG. 2 illustrates a plurality of receptacles 40 formed or disposed at longitudinal bar unit 30, and one or more receptacles 41 formed or disposed at an lateral bar unit such as first outer lateral bar unit 11. Receptacle 40 is configured to removably receive an end of lateral supporting bar unit 50 and receptacle 41 is configured to removably receive an end of longitudinal supporting bar unit 51 as illustrated in FIG. 2. In some exemplary embodiments, each lateral supporting bar unit 50 is a single supporting bar.

Receptacle 40 and receptacle 41 can be substantially the same as or different from each other. In some exemplary embodiments, receptacle 40 is disposed at upper bar 30b of a longitudinal bar unit, and receptacle 41 is disposed at vertical support 70 that is between the upper and lower bars of a lateral bar unit (e.g., first outer lateral bar 11). As such, longitudinal supporting unit 51 can be placed below lateral supporting bar unit 50. Lateral supporting bar unit 50 can be leveled with upper frame 101 and supported by longitudinal supporting unit 51. The resulted bed frame is more comfortable and more stable.

In some exemplary embodiments, a longitudinal supporting unit includes an upper longitudinal supporting bar, a lower longitudinal supporting bar, and/or at least one second vertical supporting bar disposed between the upper and lower longitudinal supporting bars. By way of example, FIG. 1 illustrates longitudinal supporting unit 51 includes upper longitudinal supporting bar 51b, lower longitudinal supporting bar 51a, and second vertical supporting bar 80 between the upper and lower longitudinal supporting bars. Second vertical supporting bar 80 has an upper end connected with the upper longitudinal supporting bar and a lower end connected with the lower longitudinal supporting bar.

In some exemplary embodiments, receptacle 41 includes an upper receptacle to removably the end of upper longitudinal supporting bar 51b of longitudinal supporting bar unit 51, and a lower receptacle to removably the end of lower longitudinal supporting bar 51a of longitudinal supporting bar unit 51. In an exemplary embodiment, each of the upper and lower receptacles of receptacle 41 is configured substantially the same as receptacle 40, as illustrated in FIG. 2.

In various exemplary embodiments, a collapsible bed frame of the present invention includes a plurality of first connectors configured to connect the outer lateral bar units with the first and second longitudinal bar units. It should be noted that any two of the first connectors can be the same as or different from each other. In some exemplary embodiments, each first connector is configured to connect one end (e.g., the first or second end) of an outer lateral bar unit (e.g., first outer lateral bar unit 11 or second outer lateral bar unit 13) with one end of an adjacent longitudinal bar unit. In some exemplary embodiments, a first connector includes a body and a supporting piece formed or disposed at the body. In an exemplary embodiment, the supporting piece is fixedly coupled with the body. The body is configured to connect or fixedly connect the end of the outer lateral bar unit. The supporting piece is configured to support and rotatably connect the end of the adjacent longitudinal bar unit.

Figure 4:
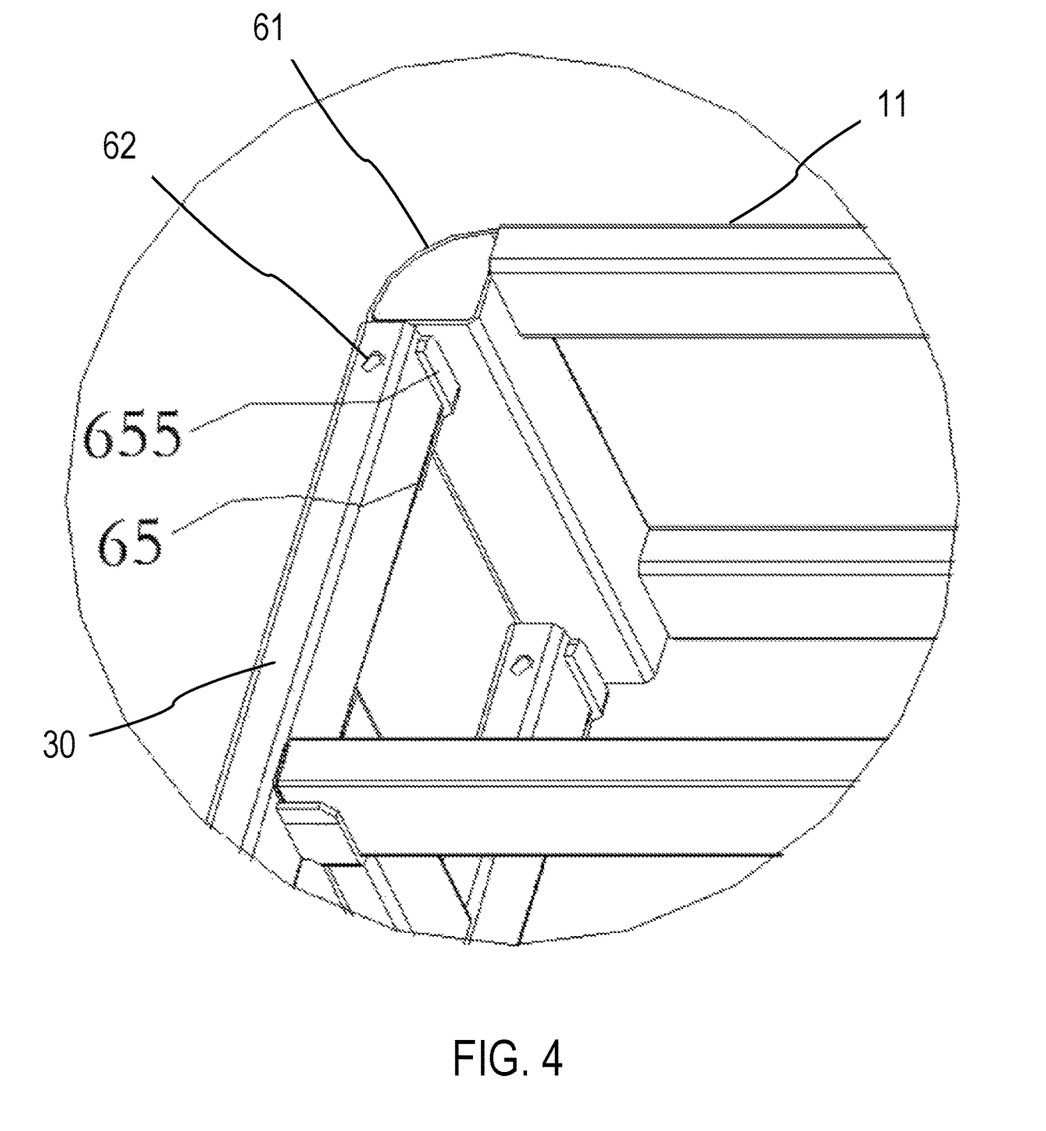
FIG. 4 is an enlarged view taken along circle A of FIG. 1.
Figure 6:
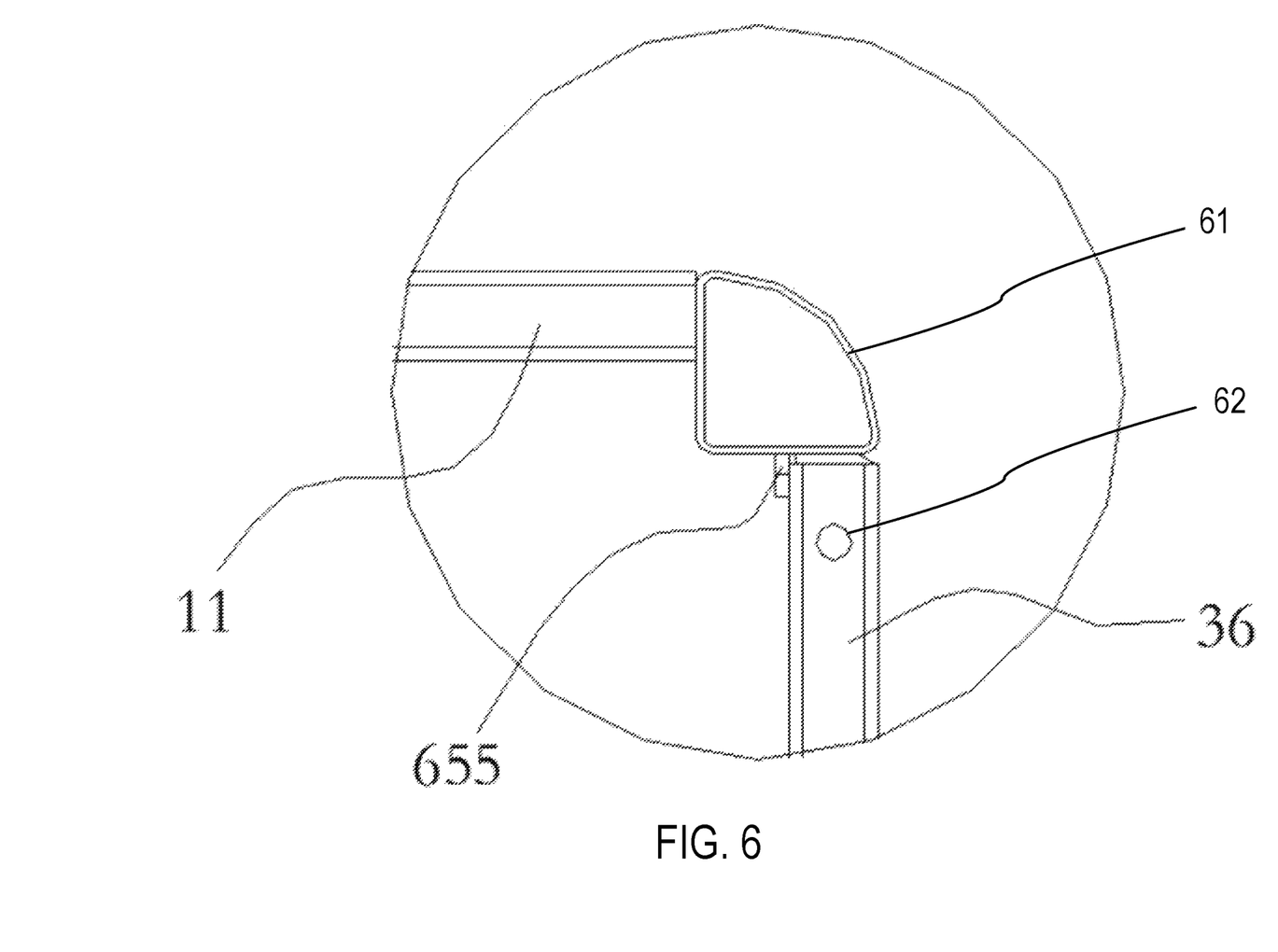
FIG. 6 is an enlarged view taken along circle B of FIG. 5.

By way of example, FIGS. 4 and 6 illustrates a bed frame including first connector 60 to connect the first or second end of an outer lateral bar unit (e.g., the outer lateral bar unit 11) with an end of adjacent longitudinal bar unit 30. First connector 60 includes body 61 and supporting piece 65. Body 61 is prismatic with a substantially fan-shaped cross section, e.g., having a curved surface and two substantially flat surfaces. The curved surface of body 61 is configured to face outwardly and serves as a rounded corner for the bed frame. With the fan-shaped cross section, the rounded corner has a larger radius and thus is smoother than other shapes (e.g., square). As such, it reduces potential accidents and improves the aesthetic appearance. In an exemplary embodiment, body 61 is a hollow tube.

The first flat surface of body 61 is configured to face an outer lateral bar unit, and fixedly connected with an end of the outer lateral bar unit, for instance, by welding or any other suitable means.

The second flat surface of body 61 is configured to face an adjacent longitudinal bar unit. Supporting piece 65 is fixedly connected with the second flat surface of body 61, for instance, by welding or any other suitable means. Supporting piece 65 is configured to hold and support the end of adjacent longitudinal bar unit 30. For instance, in some exemplary embodiments, the supporting piece is a substantially flat plate or board, and the end of adjacent longitudinal bar unit 30 is placed on the supporting piece. In some exemplary embodiments, supporting piece 65 and the end of adjacent longitudinal bar unit 30 are connected with each other by fastener 62 through holes formed at the supporting piece and the end of the adjacent longitudinal bar unit. Fastener 62 can be a bolt, a pin, a latch or the like. Fastener 62 allows adjacent longitudinal bar unit 30 to rotate along the axis of the fastener with respect to the supporting piece.

In some exemplary embodiments, first connector 60 includes a limiting piece to prevent adjacent longitudinal bar unit 30 from rotating beyond its expanded state. By way of example, FIGS. 4 and 6 illustrate limiting piece 655 disposed at an interior side of the bed frame with respect to the end of the adjacent longitudinal bar unit and substantially perpendicular to the supporting piece. In an exemplary embodiment, limiting piece 655 is integrally formed with supporting piece 65 (e.g., supporting piece 65 and limiting piece 655 are made of a bent single piece) or an individual piece fixed on supporting piece 65, with or without direct contact with the second flat surface of body 61. In an alternative exemplary embodiment, limiting piece 655 is an individual piece fixed on the second flat surface of body 61, with or without direct contact with supporting piece 65.

Supporting piece 65 can be a single piece or a stack of pieces. In some exemplary embodiments such as those where adjacent longitudinal bar unit 30 is a stack of bars that includes two or more bars, supporting piece 65 itself can include two or more supporting pieces, each for coupling with an end of one bar in the stack. By way of example, FIG. 4 illustrates two supporting pieces, one disposed at an upper portion of the body and the other disposed at a lower portion of the body. The two supporting pieces couple with the lower and upper longitudinal bars of adjacent longitudinal bar unit 30. As such, the lower and upper frames are allowed to contract and expand simultaneously. Similarly, limiting piece 655 can be a single piece or a stack of pieces.

To contract the bed frame, first, remove the lateral and longitudinal bar units 50, 51. Then, contract the bed frame so that first and second segment units 36 and 37 retreat into an interior space defined by the collapsible bed frame when it is fully expanded. In other words, allow the proximal ends of the first and second longitudinal segment units of the first longitudinal bar unit and the proximal ends of the first and second longitudinal segment units of the second longitudinal bar unit move toward each other, or toward the longitudinal central plane of the bed frame as illustrated in FIG. 3. Further contraction leads to the contracted state where first longitudinal segment unit 36 and second longitudinal segment unit 37 become substantially parallel to each other. Reverse this contraction process for expansion.

As disclosed herein, the collapsible bed frames of the present invention can contract and expand while the lateral and longitudinal bar units are connected with each other. As such, there is no need to assemble or disassemble these parts, and there is no need to carry tools such as screwdrivers and wrenches. Moreover, the sizes of the collapsible bed frames when contracted are reduced significantly. As such, they require less space for shipping, transportation and storage. Further, with the receptacles, the lateral and longitudinal supporting bar units can be easily installed or removed. As such, using a collapsible bed frame of the present invention to make a comfortable bed is not time consuming and does not require much effort.

The terminology used herein is for the purpose of describing particular implementations only and is not intended to be limiting of the claims. As used in the description of the implementations and the appended claims, the singular forms "a", "an" and "the" are intended to include the plural forms as well, unless the context clearly indicates otherwise. It will be understood that the terms "lower" or "upper", and etc. are used to describe features of the exemplary embodiments with reference to the positions of such features as displayed in the figures. It will be understood that, although the terms "first," "second," etc. may be used herein to describe various elements, these elements should not be limited by these terms. These terms are only used to distinguish one element from another. For example, a first longitudinal bar unit could be termed a second longitudinal bar unit, and, similarly, a second longitudinal bar unit could be termed a first frame, without changing the meaning of the description, so long as all occurrences of the "first longitudinal bar unit" are renamed consistently and all occurrences of the "second longitudinal bar unit" are renamed consistently.

What is claimed is:

1. A collapsible bed frame comprising:
   a plurality of lateral bar units, each arranged substantially parallel to another, each having a first end and a second end, wherein the plurality of lateral bar units comprises a first outer lateral bar unit, a second outer lateral bar unit, and at least one inner lateral bar unit disposed between the first and second outer lateral bar units;
   a plurality of first longitudinal bar units and a plurality of second longitudinal bar units, wherein between each of two adjacent lateral bar units, a first longitudinal bar unit in the plurality of first longitudinal bar units is disposed at a first side of the collapsible bed frame and rotatably connected with the first ends of the two adjacent lateral bar units, and a second longitudinal bar unit in the plurality of second longitudinal bar units is disposed at a second side of the collapsible bed frame and rotatably connected with the second ends of the two adjacent lateral bar units; and
   a plurality of first connectors, each comprising a body and a supporting piece, wherein
      the body is connected with the first or second end of a respective outer lateral bar unit in the first and second outer lateral bar units;
      the supporting piece is fixedly coupled with the body, and formed with a hole, wherein an end of a corresponding first or second longitudinal bar unit is placed on an upper side of the supporting piece and supported by the supporting piece and rotatably connected with the supporting piece by a fastener through the hole, thereby allowing the corresponding first or second longitudinal bar unit to rotate along an axis of the fastener that is substantially perpendicular to the supporting piece; and
      the body of each first connector has a substantially fan-shaped cross section.

2. The collapsible bed frame of claim 1,
wherein one or more receptacles are formed or disposed at each bar unit in the plurality of lateral bar units, the plurality of first longitudinal bar units, and the plurality of second longitudinal bar units and configured to removably receive one or more supporting bar units.

3. The collapsible bed frame of claim 1, between the respective outer lateral bar unit and its adjacent inner lateral bar unit:
each of the first and second longitudinal bar units comprises a first longitudinal segment unit and a second longitudinal segment unit rotatably connected with each other at one ends thereof, wherein the other end of the first longitudinal segment unit is connected with the supporting piece of the corresponding first connector at the respective outer lateral bar unit, and the other end of the second longitudinal segment unit is connected with the adjacent inner lateral bar unit.

4. The collapsible bed frame of claim 1, wherein each first connector further comprises a limiting piece substantially perpendicular to the supporting piece and substantially parallel to the axis of the fastener.

5. The collapsible bed frame of claim 4, wherein the limiting piece is disposed at an interior side of the bed frame with respect to the end of the corresponding first or second longitudinal bar unit.

6. A collapsible bed frame comprising:
a plurality of lateral bar units, each arranged substantially parallel to another, each having a first end and a second end, wherein the plurality of lateral bar units comprises a first outer lateral bar unit, a second outer lateral bar unit, and at least one inner lateral bar unit disposed between the first and second outer lateral bar units;
a plurality of first longitudinal bar units and a plurality of second longitudinal bar units, wherein between each of two adjacent lateral bar units, a first longitudinal bar unit in the plurality of first longitudinal bar units is disposed at a first side of the collapsible bed frame and rotatably connected with the first ends of the two adjacent lateral bar units, and a second longitudinal bar unit in the plurality of second longitudinal bar units is disposed at a second side of the collapsible bed frame and rotatably connected with the second ends of the two adjacent lateral bar units; and
a plurality of first connectors, each comprising a body and a supporting piece, wherein
the body is connected with the first or second end of a respective outer lateral bar unit in the first and second outer lateral bar units;
the supporting piece is fixedly coupled with the body, and formed with a hole, wherein an end of a corresponding first or second longitudinal bar unit is placed on an upper side of the supporting piece and supported by the supporting piece and rotatably connected with the supporting piece by a fastener through the hole, thereby allowing the corresponding first or second longitudinal bar unit to rotate along an axis of the fastener that is substantially perpendicular to the supporting piece; and
the body of each first connector comprises a curved surface, a first surface and a second surface, wherein
the curved surface faces outwardly and serves as a rounded corner for the collapsible bed frame;
the first surface is substantially flat and faces the respective outer lateral bar unit, wherein the first or second end of the outer lateral bar unit is fixedly connected with the first surface; and
the second surface is substantially flat and faces the corresponding first or second longitudinal bar unit, wherein the supporting piece is fixedly connected with the end of the corresponding first or second longitudinal bar unit.

7. The collapsible bed frame of claim 6,
wherein one or more receptacles are formed or disposed at each bar unit in the plurality of lateral bar units, the plurality of first longitudinal bar units, and the plurality of second longitudinal bar units and configured to removably receive one or more supporting bar units.

8. The collapsible bed frame of claim 6, between the respective outer lateral bar unit and its adjacent inner lateral bar unit:
each of the first and second longitudinal bar units comprises a first longitudinal segment unit and a second longitudinal segment unit rotatably connected with each other at one ends thereof, wherein the other end of the first longitudinal segment unit is connected with the supporting piece of the corresponding first connector at the respective outer lateral bar unit, and the other end of the second longitudinal segment unit is connected with the adjacent inner lateral bar unit.

9. The collapsible bed frame of claim 6, wherein each first connector further comprises a limiting piece substantially perpendicular to the supporting piece and substantially parallel to the axis of the fastener.

10. The collapsible bed frame of claim 9, wherein the limiting piece is disposed at an interior side of the bed frame with respect to the end of the corresponding first or second longitudinal bar unit.

11. The collapsible bed frame of claim 6, wherein each first connector further comprises a limiting piece to prevent the corresponding first or second longitudinal bar unit from rotating beyond its expanded state, wherein the limiting piece is disposed at an interior side of the bed frame with respect to the end of the corresponding first or second longitudinal bar unit and substantially perpendicular to the supporting piece and substantially parallel to the axis of the fastener, wherein the limiting piece is integrally formed with the supporting piece, or the limiting piece is an individual piece fixed on the supporting piece or on the body.

12. The collapsible bed frame of claim 6, wherein between the respective outer lateral bar unit and its adjacent inner lateral bar unit:
each of the first and second longitudinal bar units comprises a first longitudinal segment unit and a second longitudinal segment unit rotatably connected with each other at one ends thereof, wherein the other end of the first longitudinal segment unit is connected with the supporting piece of the corresponding first connector at the respective outer lateral bar unit, and the other end of the second longitudinal segment unit is connected with the adjacent inner lateral bar unit.

13. The collapsible bed frame of claim 6, wherein:
each bar unit in the plurality of lateral bar units, the plurality of first longitudinal bar units, and the plurality of second longitudinal bar units comprises an upper bar and a lower bar;
the upper bars of the plurality of lateral bar units, the plurality of first longitudinal bar units, and the plurality of second longitudinal bar units collectively form an upper frame of the collapsible bed frame; and
the lower bars of the plurality of lateral bar units, the plurality of first longitudinal bar units, and the plurality of second longitudinal bar units collectively form a lower frame of the collapsible bed frame.

14. The collapsible bed frame of claim 13, further comprising a plurality of vertical supporting bars disposed between the upper and lower frames, each having an upper end connected with the upper frame and a lower end connected with the lower frame.

15. The collapsible bed frame of claim 13, further comprising one or more receptacles formed or disposed at each bar unit in the plurality of lateral bar units, the plurality of first longitudinal bar units, and the plurality of second longitudinal bar units and configured to removably receive one or more supporting bar units.

16. The collapsible bed frame of claim 15, further comprising a plurality of first vertical supporting bars disposed between the upper and lower frames, each having an upper end connected with the upper frame and a lower end connected with the lower frame.

17. The collapsible bed frame of claim 15, wherein the one or more supporting bar units comprise one or more longitudinal supporting bar units coupled to the receptacles at the lateral bar units, wherein each longitudinal supporting bar unit in the one or more longitudinal supporting bar units comprises:

an upper longitudinal supporting bar, a lower longitudinal supporting bar, and one or more second vertical supporting bars disposed between the upper and lower longitudinal supporting bars, each second vertical supporting bar having an upper end connected with the upper longitudinal supporting bar and a lower end connected with the lower longitudinal supporting bar.

18. The collapsible bed frame of claim 15, wherein the receptacles at the first and second longitudinal bar units are formed or disposed at the upper bars of the first and second longitudinal bar units, and the one or more supporting bar units comprises one or more lateral supporting bars coupled to the receptacles at the first and second longitudinal bar units.

19. The collapsible bed frame of claim 13, wherein the one or more supporting bar units comprise one or more longitudinal supporting bar units coupled to the receptacles at the lateral bar units, wherein each longitudinal supporting bar unit in the one or more longitudinal supporting bar units comprises:

an upper longitudinal supporting bar, a lower longitudinal supporting bar, and one or more second vertical supporting bars disposed between the upper and lower longitudinal supporting bars, each second vertical supporting bar having an upper end connected with the upper longitudinal supporting bar and a lower end connected with the lower longitudinal supporting bar.

20. A collapsible bed frame comprising:

a plurality of lateral bar units, each arranged substantially parallel to another, each having a first end and a second end, wherein the plurality of lateral bar units comprises a first outer lateral bar unit, a second outer lateral bar unit, and at least one inner lateral bar unit disposed between the first and second outer lateral bar units;

a plurality of first longitudinal bar units and a plurality of second longitudinal bar units, wherein between each of two adjacent lateral bar units, a first longitudinal bar unit in the plurality of first longitudinal bar units is disposed at a first side of the collapsible bed frame and rotatably connected with the first ends of the two adjacent lateral bar units, and a second longitudinal bar unit in the plurality of second longitudinal bar units is disposed at a second side of the collapsible bed frame and rotatably connected with the second ends of the two adjacent lateral bar units; and a plurality of first connectors, each comprising a body and a supporting piece, wherein the body is connected with the first or second end of a respective outer lateral bar unit in the first and second outer lateral bar units;

the supporting piece is fixedly coupled with the body, and formed with a hole, wherein an end of a corresponding first or second longitudinal bar unit is placed on an upper side of the supporting piece and supported by the supporting piece and rotatably connected with the supporting piece by a fastener through the hole, thereby allowing the corresponding first or second longitudinal bar unit to rotate along an axis of the fastener that is substantially perpendicular to the supporting piece; and the body of each first connector is prismatic with a substantially fan-shaped cross section.

* * * * *